(12) United States Patent
Teitel et al.

(10) Patent No.: US 9,473,176 B2
(45) Date of Patent: Oct. 18, 2016

(54) IMPLEMENTATION OF LOG AND INVERSE OPERATION IN A GALOIS FIELD

(71) Applicant: APPLE INC., Cupertino, CA (US)

(72) Inventors: Moti Teitel, Herzlia Pituach (IL); Micha Anholt, Herzlia Pituach (IL)

(73) Assignee: APPLE INC., Cupertino, CA (US)

( * ) Notice: Subject to any disclaimer, the term of this patent is extended or adjusted under 35 U.S.C. 154(b) by 26 days.

(21) Appl. No.: 14/555,612

(22) Filed: Nov. 27, 2014

(65) Prior Publication Data

US 2016/0156368 A1  Jun. 2, 2016

(51) Int. Cl.
*H03M 13/00* (2006.01)
*H03M 13/15* (2006.01)
*H04L 9/06* (2006.01)

(52) U.S. Cl.
CPC ........ *H03M 13/1505* (2013.01); *H04L 9/0643* (2013.01)

(58) Field of Classification Search
CPC .......... H03M 13/1505; H04L 9/0643
See application file for complete search history.

(56) References Cited

U.S. PATENT DOCUMENTS

| | | |
|---|---|---|
| 5,710,782 A | 1/1998 | Weng |
| 5,761,102 A | 6/1998 | Weng |
| 5,771,244 A | 6/1998 | Reed et al. |
| 5,905,740 A | 5/1999 | Williamson |
| 6,199,088 B1 | 3/2001 | Weng et al. |
| 6,199,188 B1 | 3/2001 | Shen et al. |
| 6,279,023 B1 | 8/2001 | Weng et al. |
| 8,099,655 B1 * | 1/2012 | Tan ............... H03M 13/158 714/781 |
| 2003/0140078 A1 * | 7/2003 | Feuser ............... G06F 7/724 708/492 |
| 2010/0306299 A1 * | 12/2010 | Reidenbach ............ G06F 7/726 708/492 |

FOREIGN PATENT DOCUMENTS

JP    S6432154 A    2/1989

OTHER PUBLICATIONS

Doliskani et al., "Taking Roots over High Extensions of Finite Fields", 12 pages, Oct. 19, 2011 (http://arxiv.org/abs/1110.4350).
Barreto et al., "Efficient Computation of Roots in Finite Fields", Designs, Codes and Cryptography, vol. 39, 8 pages, May 2006.
Smith et al., "Staircase Codes: FEC for 100 Gb/s OTN", Journal of Lightwave Technology, vol. 30, No. 1, pp. 110-117, Jan. 1, 2012.
Guajardo et al., "Efficient Algorithms for Elliptic Curve Cryptosystems", Lecture Notes in Computer Science, vol. 1294, pp. 342-356, year 1997.
Satoh et al., "A Compact Rijndael Hardware Architecture with S-Box Optimization", Lecture Notes in Computer Science, vol. 2248, pp. 239-254, year 2001.
Anholt et al., U.S. Appl. No. 14/551,110, filed Nov. 24, 2014.

* cited by examiner

*Primary Examiner* — Sam Rizk
(74) *Attorney, Agent, or Firm* — D. Kligler I.P. Services Ltd.

(57) ABSTRACT

A method, including factoring an order of a multiplicative group of a Galois Field to produce a first integer factor p and a second integer factor q, wherein the multiplicative group includes $(2^m-1)$ elements, m a non-negative integer, so that $2^m-1=pq$. The method further includes receiving an element x of the Galois Field expressible as $\alpha^{(qi+j)}$, where $\alpha$ is a primitive element of the group, i is a first non-negative integer less than p, and j is a second integer less than q. An inverse or a logarithm of the element x is calculated as a function of qi and j.

20 Claims, 4 Drawing Sheets

IMPLEMENTATION OF LOG AND INVERSE OPERATION IN A GALOIS FIELD

TECHNICAL FIELD

Embodiments described herein relate generally to operating with Galois Field elements, and particularly to methods and systems for finding an inverse and a logarithm of such an element.

BACKGROUND

Algebraic decoders may use operations on Galois Field elements to decode error correction codes. The operations typically include determining an inverse or a logarithm of an element, and methods for such determination are known in the art.

For example, U.S. Pat. No. 6,199,088, to Weng et al., whose disclosure is incorporated herein by reference, describes a circuit for determining multiplicative inverses in certain Galois Fields. A division of two elements B/A is performed by producing a multiplicative inverse of A and then multiplying B by $A^{-1}$.

U.S. Pat. No. 6,279,023, to Weng et al., whose disclosure is incorporated herein by reference, describes a system for computing the multiplicative inverse of an element of a Galois Field without using tables. The system is stated to raise the element to the power $2^m-2$.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

An embodiment that is described herein provides a method including factoring an order of a multiplicative group of a Galois Field to produce a first integer factor p and a second integer factor q, wherein the multiplicative group includes ($2^m-1$) elements, m a non-negative integer, so that $2^m-1=pq$. An element x of the Galois Field is received, x being expressible as $\alpha^{(qi+j)}$, where $\alpha$ is a primitive element of the group, i is a first non-negative integer less than p, and j is a second integer less than q. An inverse or a logarithm of the element x is calculated as a function of qi and j.

In a disclosed embodiment calculating the inverse or the logarithm includes raising the element x to a power p, so as to generate an expression $x^p$.

In another disclosed embodiment calculating the inverse or the logarithm includes:

determining a first inverse $\alpha^{-qi}$;
determining a second inverse $\alpha^{-j}$; and
multiplying the first inverse by the second inverse so as to determine the function of qi and j as an expression $\alpha^{-(qi+j)}$ and thereby determine the inverse, $x^{-1}$, of the element x.

Determining the first inverse $\alpha^{-qi}$ may include using a hash function and a look-up table to evaluate the first inverse. Alternatively or additionally, determining the second inverse $\alpha^{-j}$ may include using a hash function and a look-up table to evaluate the second inverse.

In an alternative embodiment calculating the inverse or the logarithm includes:

determining a first value for the second integer j;
determining a second value for qi; and adding the first and the second value so as to determine the function of qi and j as an expression (qi+j) and thereby determine the logarithm of the element x as (qi+j).

Determining the first value may include using a hash function to evaluate the first value. Determining the second value may include using a hash function to evaluate the second value.

There is further provided, in accordance with an embodiment that is described herein, circuitry, including an exponentiation block, which is configured to receive an element x of a Galois Field, wherein an order of a multiplicative group of the Galois Field comprises integer factors p and q, and wherein the multiplicative group includes ($2^m-1$) elements, m a non-negative integer, so that $2^m-1=pq$, and wherein the element x is expressible as $\alpha^{(qi+j)}$, where $\alpha$ is a primitive element of the group, i is a first integer less than p, and j is a second integer less than q, the exponentiation block being configured to raise the element x to a power p so as to generate an expression $x^p$.

The circuitry also includes at least one of:

a multiplication block, configured to receive a first function of j and a second function of qi, the first and the second function being generated in response to operation of the exponentiation block, and configured to multiply the first and second function so as to generate and output a product comprising an inverse of the element x; and an addition block, configured to receive j and qi generated in response to operation of the exponentiation block, and configured to sum j and qi so as to generate and output a sum comprising a logarithm of the element x.

There is further provided, in accordance with an embodiment that is described herein, a method, including factoring a multiplicative group of a Galois Field to produce a first integer factor p and a second integer factor q, wherein the multiplicative group includes ($2^m-1$) elements, m a non-negative integer, so that $2^m-1=pq$. An element x of the Galois Field, expressible as $\alpha^e$, where $\alpha$ is a primitive element of the group, and e is an integer, is received. A first value of e mod q and a second value of e mod p are determined. The first value and the second value are applied to a Chinese Remainder Theorem so as to evaluate e as a logarithm of x.

In an alternative embodiment the method includes raising the element x to a power equal to the first integer factor p, so as to generate an expression $x^p$. The method may also include inputting the expression $x^p$ to a hash function so as to generate the first value of e mod q.

In a further alternative embodiment the method includes raising the element x to a power equal to the second integer factor q, so as to generate an expression $x^q$. The method may also include inputting the expression $x^q$ to a hash function so as to generate the second value of e mod p.

These and other embodiment will be more fully understood from the following detailed description of the embodiments thereof, taken together with the drawings in which:

DETAILED DESCRIPTION OF EMBODIMENTS

Overview

An embodiment described herein provides circuitry, which may be formed as an integrated circuit, and which is able to generate both the inverse and the logarithm of a Galois Field element, or either the inverse or the logarithm. The Galois field is assumed to have a multiplicative group of $(2^m-1)$ elements, where m an integer, and the group is assumed to have factors p and q, so that $2^m-1=pq$.

The circuitry receives an element x of the Galois Field, which may be written in the form of an expression $\alpha^{(qi+j)}$, where $\alpha$ is a primitive element of the multiplicative group, i is an integer less than p, and j is another integer less than q. The inverse is calculated as a first function of qi and j; the logarithm is calculated as a second function of qi and j.

Typically, in order to find the value of j for element x, x is raised to a power p, to produce $x^p$, and the expression $x^p$ is used as an input to a first hash function. The value of j is then used as an input to a first look-up table, which is configured to generate an expression $\alpha^{-j}$.

A second hash function and a second look-up table are used to find the value of qi, and an expression $\alpha^{-qi}$. In some embodiments $x^p$ may be used as an input to the second look-up table, enabling j and $\alpha^{-j}$ to be computed in parallel.

The inverse of x is produced by multiplying $\alpha^{-j}$ and $\alpha^{-qi}$; the logarithm of x is produced by summing qi and j.

Providing circuitry, that is a single circuit which is configured to generate both the inverse and the logarithm of a Galois Field element, is an efficient method for saving space when the circuitry is implemented in an integrated circuit.

System Description

Figure 1:
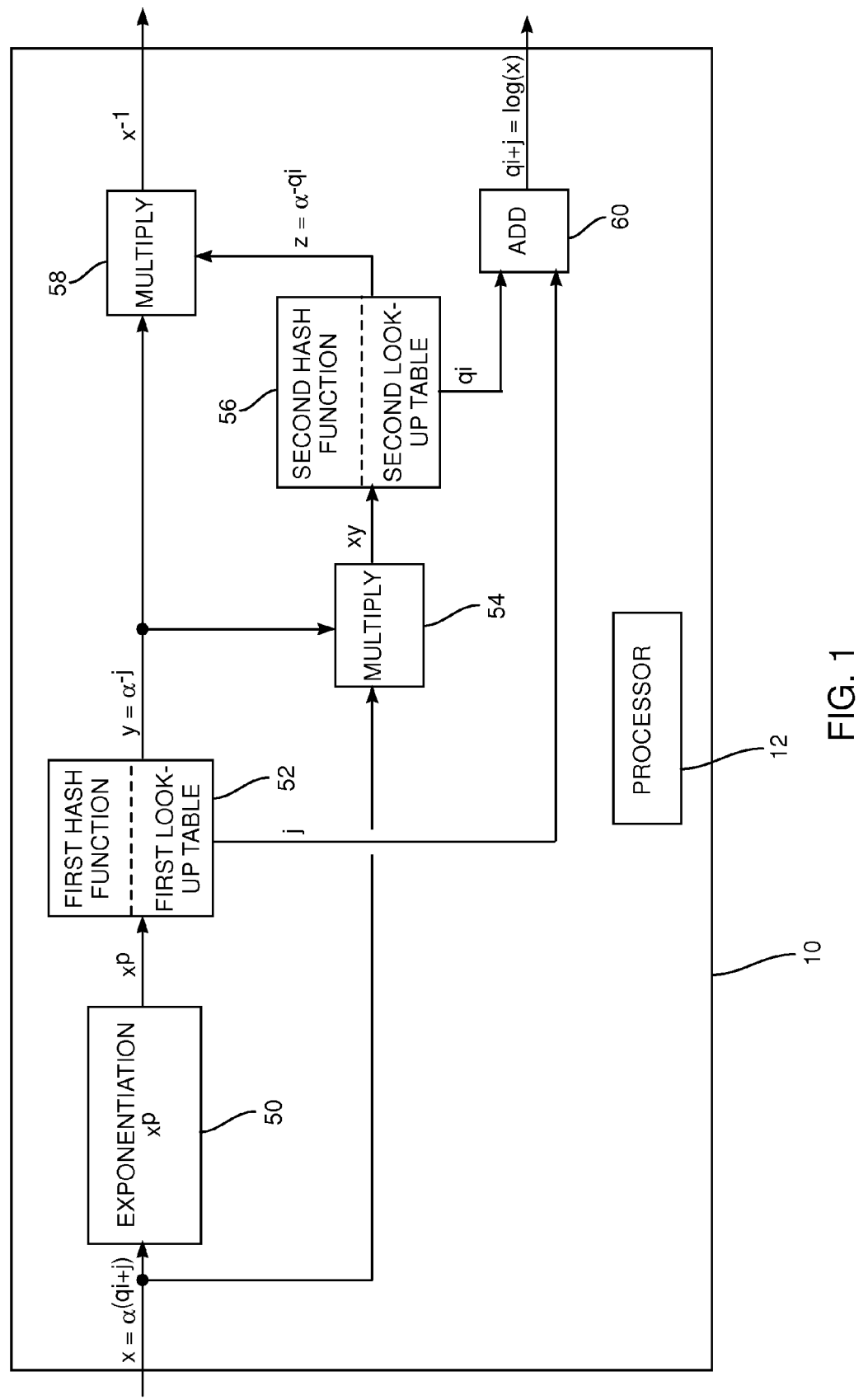
FIG. 1 is a schematic block diagram of circuitry that is configured to find the logarithm and the inverse of a Galois Field element, in accordance with an embodiment that is described herein.
Figure 2:
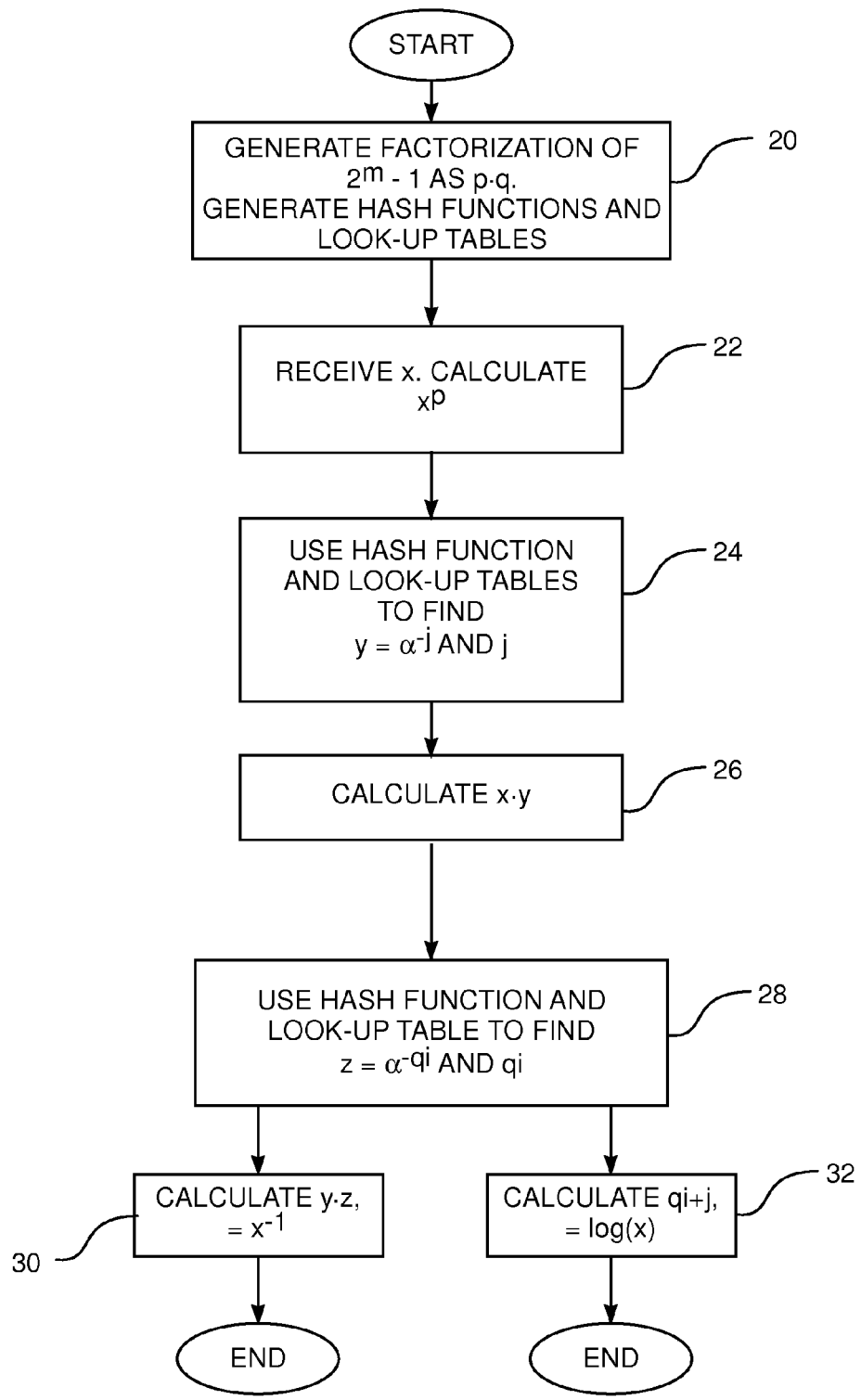
FIG. 2 is a flowchart comprising steps performed by the circuitry of FIG. 1, in accordance with an embodiment that is described herein.

Reference is now made to FIG. 1, which is a schematic block diagram of circuitry 10 that is configured to find the logarithm and the inverse of a Galois Field element, and to FIG. 2 which is a flowchart comprising steps performed by the circuitry, in accordance with embodiments that are described herein. Circuitry 10 may be formed as an integrated circuit, or as a portion of an integrated circuit.

The description herein of circuitry 10, and of operations performed by the circuitry, assumes that the circuitry is configured to operate for a Galois Field of $2^m$ elements, where m is an integer, and where the multiplicative group of the Galois Field has a primitive element $\alpha$. The number of elements in the corresponding multiplicative group of the Galois Field, i.e., the order of the group, is $2^m-1$.

In some embodiments circuitry 10 may comprise a central processor 12, which is configured to supply data to, and to operate, other elements present in the circuitry. Processor 12 may be a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In some embodiments, processor 12 may be one or more processors or processor cores capable of executing instructions stored on a non-transitory computer readable medium to perform and carry out the functions described herein.

In other embodiments circuitry 10 does not comprise a central processor, and elements of the circuitry are configured to operate on a "stand-alone" basis. For simplicity, and except where otherwise stated, the following description assumes that circuitry 10 does not comprise a central processor, and those having ordinary skill in the art will be able to adapt the description, mutatis mutandis, for embodiments which have a central processor.

In an initial step 20 of the flowchart, the order of the multiplicative group is factored, if possible, to produce two factors p, q, according to equation (1):

$$2^m-1=p \cdot q \qquad (1)$$

where p, q>1, p, q $\in$ Z

The cyclic nature of the multiplicative group ensures that the multiplicative group has subgroups of size p and q. There are $2^m-1$ different elements x of the group, and any element x of the group may be written according to equation (2):

$$x=\alpha^k=\alpha^{qi+j} \qquad (2)$$

where $\alpha$ is a primitive element of the group, k=0, 1, ... pq, i=0, 1, ..., p-1, and j=0, 1, ..., q-1.

Equation (2) may be rewritten as follows:

$$x^p=\alpha^{kp}=\alpha^{(qi+j)p}=\alpha^{pqi+pj}=\alpha^{pj} \qquad (3)$$

From equation (3), since j has q discrete values, $x^p$ also has q discrete values, and belongs to a cyclic subgroup having size q. Similarly, $x^q$ has p discrete values, and belongs to a cyclic subgroup having size p.

In step 20 a first hash function is calculated for each of the q values of $x^p$, each of the values being a Q bit number where $Q=\lceil \log_2 q \rceil$. A second hash function is calculated for each of the p values of $x^q$, each of the values being a P bit number where $P=\lceil \log_2 p \rceil$. In addition, in step 20 a first Q×m look-up table and a second P×m look-up table are prepared. The hash functions and tables are incorporated into circuitry 10, and are explained in more detail below.

For embodiments where processor 12 is absent, elements of circuitry 10, corresponding to the actions of step 20, are typically implemented for predetermined values of m, p, q, and a. For embodiments where processor is present, at least some of the actions of step 20 may be implemented by the processor, and at least some of the values of m, p, q, and a may be selected by the processor.

In an exponentiation step 22 circuitry 10 receives Galois Field element x, and a value of $x^p$ is calculated. In circuitry 10, step 22 is performed by an exponentiation block 50, configured to receive a Galois Field element as an input and to raise the input by a power of p.

As shown in equation (3), $x^p$ is equivalent to $\alpha^{pj}$. In a first hash function/look-up table step 24, $x^p$ is used as the input to the first hash function, which is configured to output the value of j corresponding to $x^p$. It will be understood that j may have any of q values 0, 1, ... q-1. Also in step 24, the value of j is used as an input to the first look-up table, which is configured to output $y=\alpha^{-j}$. Alternatively, $x^p$ or its hash function may be used as an input to the first look-up table, enabling parallel computing of j and $\alpha^{-j}$. Step 24 may be implemented in circuitry 10 by incorporating the first hash function and the first look-up table block 52, calculated in initial step 20, as an array comprising linear function elements and/or read only memory (ROM) elements. In some embodiments, rather than using a look-up table, an exponentiation block, generally similar to block 50, may be used to determine the value of y.

The value of y, i.e., $\alpha^{-j}$, is input to a first multiplication block 54, which is also configured to receive the value of input x.

In a first multiplication step 26, block 54 calculates the product of its two inputs, x, y, and outputs the value of expression xy. An expression for xy, derived from equation (2) and the expression for y, is given by equation (4):

$$x \cdot y = \alpha^{qi+j} \cdot \alpha^{-j} = \alpha^{qi} \quad (4)$$

From equation (4), since i has p discrete values, 0, 1, ..., p−1, the product xy has p discrete values.

As shown in equation (4), xy is equivalent to $\alpha^{qi}$. In a second hash function/look-up table step 28, xy, i.e., $\alpha^{qi}$, is used as the input to the second hash function, which is configured to output the value of i corresponding to xy. Also in step 28, the value of i or a hash function of xy is used as an input to the second look-up table, which is configured to output $z = \alpha^{-qi}$. Step 28 may be implemented in circuitry 10 by incorporating the second hash function and the second look-up table, calculated in initial step 20, as an array 56 comprising linear function elements and/or read only memory (ROM) elements. In some embodiments, the second look-up table may be replaced by an exponentiation block, generally similar to block 50, that is used to determine the value of z.

The value of z, $\alpha^{-qi}$, derived from the second look-up table, is used as one input to a multiplication block 58. Multiplication block 58 also receives, as a second input, the value of y, $\alpha^{-j}$, and the block determines the value of the product yz. Equation (5), which uses the expression for x given in equation (2), is an expression for the product yz:

$$y \cdot z = \alpha^{-j} \cdot \alpha^{-qi} = \alpha^{-(qi+j)} = x^{-1} \quad (5)$$

In an inverse generation step 30, multiplication block 58 outputs the product yz as the inverse, $x^{-1}$, of the Galois Field element x input to exponentiation block 50.

The value of qi, derived from the second hash function, is used as one input to an addition block 60. Block 60 receives as a second input the value of j derived from the first hash function, and the block determines the sum (qi+j). Since $x = \alpha^{(qi+j)}$, the sum (qi+j) corresponds to log(x).

In a logarithm generation step 32, addition block 60 outputs the sum (qi+j) as the logarithm, log(x), of the Galois Field element x input to exponentiation block 50.

Figure 3:
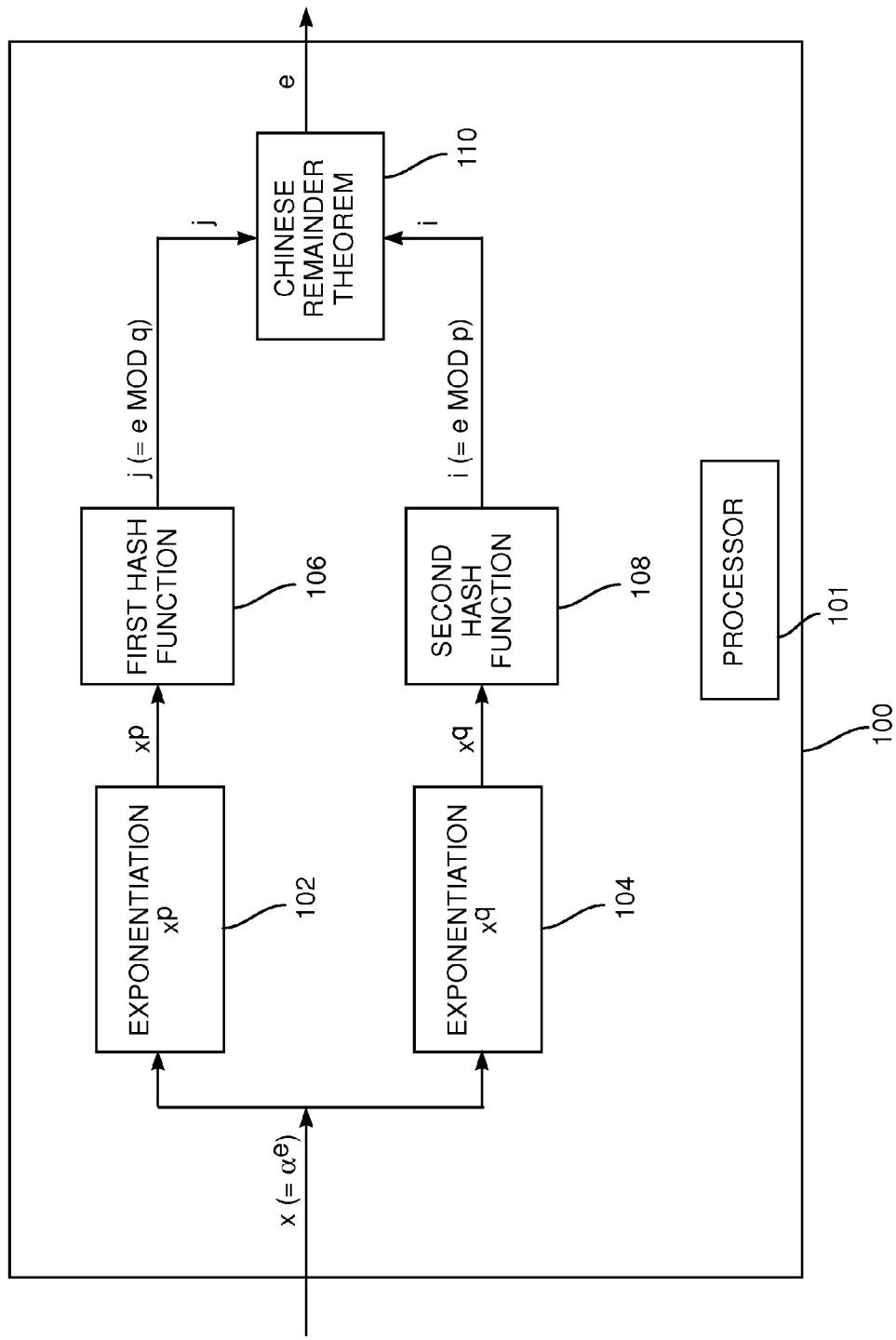
FIG. 3 is a schematic block diagram of circuitry that is configured to find the logarithm of a Galois Field element in accordance with an alternative embodiment that is described herein.
Figure 4:
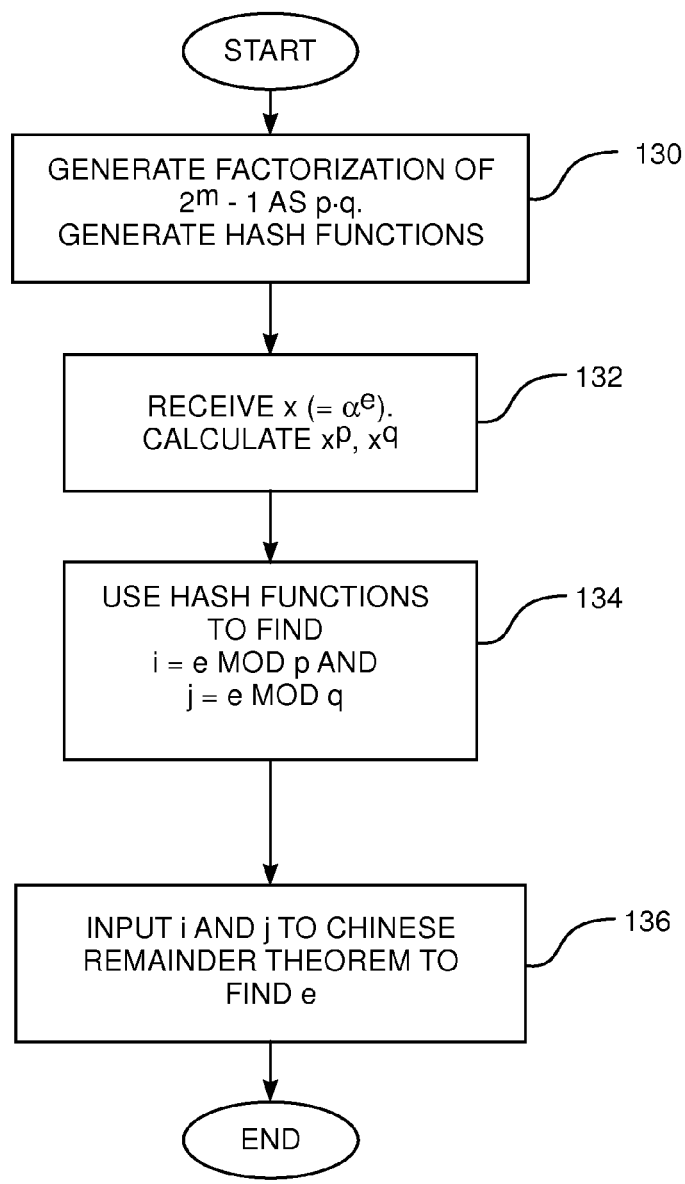
FIG. 4 is a flowchart comprising steps performed by the circuitry of FIG. 3, in accordance with an embodiment that is described herein.

FIG. 3 is a schematic block diagram of circuitry 100 that is configured to find the logarithm of a Galois Field element, and FIG. 4 is a flowchart comprising steps performed by the circuitry, in accordance with alternative embodiments that are described herein. Circuitry 100 may be formed as an integrated circuit, or as a portion of an integrated circuit. The description herein of circuitry 100, and of operations performed by the circuitry, assumes that the circuitry is configured to operate for a Galois Field of $2^m$ elements, where m is a non-negative integer, and where the elements have a primitive element $\alpha$.

In some embodiments circuitry 100 may comprise a central processor 101, which is configured to supply data to, and to operate, other elements present in the circuitry. Typically, processor 101 is generally similar in function and operation to processor 12.

In other embodiments circuitry 100 does not comprise a central processor, and elements of the circuitry are configured to operate on a "stand-alone" basis. For simplicity, and except where otherwise stated, the following description assumes that circuitry 10 does not comprise a central processor, and those having ordinary skill in the art will be able to adapt the description, mutatis mutandis, for embodiments which have a central processor.

An initial step 130 of the flowchart is generally the same as initial step 20 of the flowchart of FIG. 2, except that no look-up tables are produced. Thus the order of the multiplicative group is factored, to produce two factors p, q. The factorization is according to equation (1), above. In addition, a first hash function is calculated for each of the q values of $x^p$, and a second hash function is calculated for each of the p values of $x^q$. The hash functions may be incorporated as ROM elements into circuitry 100 and are explained in more detail below.

A Galois Field element x may be written according to equation (6):

$$x = \alpha^e \quad (6)$$

where e is the log of x.

e may be written:

$$e = (gq+j) \quad (7)$$

where g is a positive integer, and j=0, 1, ..., q−1. Note that j=e mod q.

Combining equations (6) and (7) gives:

$$x = \alpha^e = \alpha^{(gq+j)} \quad (8)$$

The first hash function of step 130 is configured to input an expression $x^p$ and output the corresponding value of j.

Alternatively, e may be written:

$$e = (hp-i) \quad (9)$$

where h is a positive integer, and i=0, 1, ..., p−1. Note that in this case i=e mod p.

Combining equations (6) and (9) gives:

$$x = \alpha^e = \alpha^{(hp+i)} \quad (10)$$

The second hash function of step 130 is configured to input an expression $x^q$ and output the corresponding value of i.

For embodiments where processor 101 is absent, elements of circuitry 100, corresponding to the actions of step 130, are typically implemented for predetermined values of m, p, q, and $\alpha$. For embodiments where processor 101 is present, at least some of the actions of step 130 may be implemented by the processor, and at least some of the values of m, p, q, and $\alpha$ may be selected by the processor.

In an exponentiation step 132, values of $x^p$ and $x^q$ are calculated, in respective exponentiation blocks 102 and 104, and in a hash function step 134 the values are used as respective inputs for a first hash function array 106 and a second hash function array 108, the arrays being formed of ROM elements. The first and second hash function arrays are configured to operate as described above.

Hash function array 106 generates a value of j, corresponding to its input $x^p$, and hash function array 108 generates a value of i, corresponding to its input $x^q$.

In a final step 136 the values of j and i are used as inputs for a Chinese Remainder Theorem block 110. Block 110 outputs the lowest non-negative integer that when divided by q gives j (e mod q), and when divided by p gives i (e mod p). It will be understood that the lowest non-negative integer corresponds to e, i.e., log x. It will also be understood that by adding an exponentiation block, configured to evaluate the expression $\alpha^{-e}$, after block 110, circuitry 100 may be implemented to generate the multiplicative inverse of x.

The embodiments described herein use hash functions having inputs $x^p$ or $x^q$, and the functions may be calculated, as is stated above, using linear functions, ROM elements, or other memory elements and/or circuit elements. Alternatively or additionally, there are special values of p, q where the hash function can be easily formulated using XOR gates.

For example, suppose p can be expressed as $2^{m'}-1$. $x^q$ has $2^{m'}-1$ nonzero outcomes in the multiplicative group. The set of those $2^{m'}-1$ values together with the 0 element (which is also a $q^{th}$ power in the field) constitute a field. There is a field isomorphism between this field and Galois Field $GF(2^{m'})$. This isomorphism can be formulated as a linear function. It performs a linear transformation between a subspace of $GF(2^m)$ (as a vector space over $GF(2)$) and the linear space $GF(2^{m'})$ as a vector space over $GF(2)$. The isomorphism can be applied, using XOR gates, to formulate the linear operations required, so reducing the amount of circuitry required for the hash functions.

Although the embodiments described herein mainly address determining a logarithm and an inverse, the methods and systems described herein can also be used in other applications, such as in determining other functions of j and/or i, for example a root of an element. Furthermore, the evaluation of a logarithm and/or an inverse of a Galois Field element may be required in the fields of error correction codes, and in encryption, decryption, and/or cracking in cryptography. For example, Reed-Solomon code and BCH decoding operations involve multiple division operations. One method of dividing a first Galois field element by a second Galois field element is to determine the multiplicative inverse of the second element, and multiply the result by the first element. Thus, implementing an embodiment described herein for finding the inverse of a Galois Field element reduces the time required for the decoding.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
providing a factoring of an order of a multiplicative group of a Galois Field including $2^m-1$ elements, and having a primitive element $\alpha$, into a first integer factor p and a second integer factor q, wherein p and q are both greater than 1, so that $2^m-1=pq$;
receiving, by at least one processor, an element x of the Galois Field;
determining, by the at least one processor, a first value j equal to e mod q, where e is an integer such that $\alpha^e=x$;
determining, by the at least one processor, a second value which can be used together with the first value to determine a logarithm of the received element x;
determining, by the at least one processor, a logarithm of the element x as a function of the first and second values; and
encrypting, decrypting or decoding a code responsive to the determined logarithm.

2. The method according to claim 1, wherein determining the first value j comprises raising the received element x to a power p, so as to generate an expression $x^p$ and determining the value j from $x^p$.

3. The method according to claim 1, wherein determining the second value comprises:

determining, by the at least one processor, a first inverse $\alpha^{-j}$;
multiplying, by the at least one processor, the received element x by the inverse $\alpha^{-j}$; and
determining the second value from the multiplication result $x \cdot \alpha^{-j}$.

4. The method according to claim 3, further comprising determining a second inverse $\alpha^{-qi}$, wherein qi is a difference between e and the determined value j, and determining an inverse of element x by multiplying the first inverse $\alpha^{-j}$ and the second inverse $\alpha^{-qi}$.

5. The method according to claim 3, wherein determining the first inverse $\alpha^{-j}$ comprises using a hash function and a look-up table to evaluate the first inverse.

6. The method according to claim 1, wherein determining the second value comprises determining a value qi which is a difference between e and the determined value j and wherein determining the logarithm comprises:
adding the determined values qi and j.

7. The method according to claim 2, wherein determining the first value j comprises applying a hash function to $x^p$.

8. The method according to claim 3, wherein determining the second value comprises applying a hash function to the multiplication result $x \cdot \alpha^{-j}$.

9. The method according to claim 1, wherein determining the second value comprises determining e mod p.

10. The method according to claim 1, wherein determining the logarithm of the element x comprises applying the first value and the second value to a Chinese Remainder Theorem.

11. Circuitry, comprising:
an exponentiation block, which is configured to receive an element x of a Galois Field, wherein an order of a multiplicative group of the Galois Field comprises integer factors p and q, and wherein the multiplicative group comprises $(2^m-1)$ elements, m a non-negative integer, so that $2^m-1=pq$, and wherein the element x is expressible as $\alpha^{(qi+j)}$, where $\alpha$ is a primitive element of the group, i is a first integer less than p, and j is a second integer less than q, the exponentiation block being configured to raise the element x to a power p so as to generate an expression $x^p$;
a first circuitry configured to determine a function of j responsive to $x^p$;
a second circuitry configured to determine qi or a function of qi responsive to x and a result from the first circuitry; and
at least one of:
a multiplication block, configured to receive the determined function of j from the first circuitry and the determined function of qi from the second circuitry, and configured to multiply the function of j and the function of qi, so as to generate and output a product comprising an inverse of the element x; and
an addition block, configured to receive j and qi from the first and second circuitry respectively, and configured to sum j and qi so as to generate and output a sum comprising a logarithm of the element x.

12. The circuitry according to claim 11, wherein the first circuitry comprises a hash function and a look-up table block configured to receive the expression $x^p$ and in response to generate the second integer j.

13. The circuitry according to claim 12, wherein the hash function and the look-up table block are configured to receive the expression $x^p$ and in response to generate the determined function of j as an expression $\alpha^{-j}$.

14. The circuitry according to claim 11, wherein the second circuitry comprises a hash function and a look-up table block configured, in response to operation of the exponentiation block, to generate qi and $\alpha^{-q^i}$.

15. The circuitry according to claim 11, wherein the circuitry comprises both the multiplication block and the addition block.

16. A non-transitory computer-readable medium including instructions that, when executed by one or more processors of a circuit, cause the one or more processors to perform a method, the method comprising:

providing a factoring of an order of a multiplicative group of a Galois Field including $2^m$ elements, and having a primitive element $\alpha$, into a first integer factor p and a second integer factor q, wherein p and q are both greater than 1, so that $2^m-1=pq$;

receiving an element x of the Galois Field;

determining a first value of e mod q, where e is an integer such that $\alpha^e=x$;

determining a second value of e mod p;

applying the first value and the second value to a Chinese Remainder Theorem so as to evaluate e as a logarithm of x; and encrypting, decrypting or decoding a code responsive to the determined logarithm of the element x.

17. The non-transitory computer-readable medium according to claim 16, wherein determining the first value comprises raising the element x to a power equal to the first integer factor p, so as to generate an expression $x^p$ and determining the first value of e mod q from $x^p$.

18. The non-transitory computer-readable medium according to claim 17, wherein determining the first value comprises inputting the expression $x^p$ to a hash function so as to generate the first value of e mod q.

19. The non-transitory computer-readable medium according to claim 16, wherein determining the second value comprises raising the element x to a power equal to the second integer factor q, so as to generate an expression $x^q$ and determining the second value of e mod p from $x^q$.

20. The non-transitory computer-readable medium according to claim 19, wherein determining the second value comprises inputting the expression $x^q$ to a hash function so as to generate the second value of e mod p.

* * * * *